United States Patent
Bisschops et al.

(10) Patent No.: US 11,293,324 B2
(45) Date of Patent: Apr. 5, 2022

(54) PRO-ACTIVE THERMAL MEASURE TO RECOVER AND OR RETAIN DENOX PERFORMANCE

(71) Applicant: DAF Trucks N.V., Eindhoven (NL)

(72) Inventors: Kevin Arnold Maria Bisschops, Hechtel (BE); Christiaan Kurvers, Koningslust (NL); Geert Odulphus Martinus Van Kollenburg, Sint-Oedenrode (NL)

(73) Assignee: DAF Trucks N.V., Eindhoven (NL)

( * ) Notice: Subject to any disclaimer, the term of this patent is extended or adjusted under 35 U.S.C. 154(b) by 0 days.

(21) Appl. No.: 17/046,401

(22) PCT Filed: Apr. 9, 2019

(86) PCT No.: PCT/NL2019/050210
§ 371 (c)(1),
(2) Date: Oct. 9, 2020

(87) PCT Pub. No.: WO2019/199163
PCT Pub. Date: Oct. 17, 2019

(65) Prior Publication Data
US 2021/0189934 A1 Jun. 24, 2021

(30) Foreign Application Priority Data
Apr. 10, 2018 (NL) .................................... 2020739

(51) Int. Cl.
*F01N 3/20* (2006.01)
*F01N 3/10* (2006.01)
(Continued)

(52) U.S. Cl.
CPC ............. *F01N 3/208* (2013.01); *F01N 3/103* (2013.01); *F01N 9/002* (2013.01);
(Continued)

(58) Field of Classification Search
CPC .......... F01N 3/208; F01N 9/002; F01N 3/103; F01N 2900/0422; F01N 2900/1602;
(Continued)

(56) References Cited

U.S. PATENT DOCUMENTS

2014/0331644 A1* 11/2014 Kumar .................... F01N 9/005
60/274
2015/0128576 A1* 5/2015 Osumi ................ F02D 41/1446
60/287

FOREIGN PATENT DOCUMENTS

EP 2853707 A1 4/2015
WO 2009100412 A1 8/2009

OTHER PUBLICATIONS

Jun. 7, 2019, International Search Report and Written Opinion, PCT/NL2019/050210.

* cited by examiner

*Primary Examiner* — Brandon D Lee
(74) *Attorney, Agent, or Firm* — Banner & Witcoff, Ltd.

(57) ABSTRACT

A short cyclic thermal treatment process in an engine aftertreatment system of a diesel engine in a vehicle, which may be able to recover and/or retain NOx conversion performance of an engine aftertreatment system by keeping the system clean from unintended pollution like accumulated urea deposits. The thermal treatment process is controlled by a process controller, arranged to carry out a long cyclic cleaning process at a first time interval, at a first exhaust gas temperature higher than the operational temperature in regeneration mode; combined with a short cyclic thermal treatment process at a second time interval, at a second exhaust gas temperature higher than the operational temperature in non-regeneration mode; wherein the second elevated exhaust gas temperature is lower than the first temperature.

16 Claims, 7 Drawing Sheets

(51) Int. Cl.
*F02D 41/02* (2006.01)
*F01N 9/00* (2006.01)
(52) U.S. Cl.
CPC ...... *F02D 41/0245* (2013.01); *F01N 2610/02* (2013.01); *F01N 2610/03* (2013.01); *F01N 2900/0422* (2013.01); *F01N 2900/1404* (2013.01); *F01N 2900/1602* (2013.01)
(58) Field of Classification Search
CPC ............ F01N 2610/02; F01N 2610/03; F01N 2900/1404; F01N 2900/0418; F01N 2900/1606; F01N 3/2066; F02D 41/0245; Y02A 50/20; Y02T 10/40; Y02T 10/12
See application file for complete search history.

PRO-ACTIVE THERMAL MEASURE TO RECOVER AND OR RETAIN DENOX PERFORMANCE

CROSS-REFERENCE TO RELATED APPLICATIONS

This application is a U.S. National Stage application under 35 U.S.C. § 371 of International Application PCT/NL2019/050210 (published as WO 2019/199163 A1), filed Apr. 9, 2019, which claims the benefit of priority to Application NL 2020739, filed Apr. 10, 2018. Benefit of the filing date of these prior applications is hereby claimed. Each of these prior applications is hereby incorporated by reference in its entirety.

BACKGROUND

In modern day diesel engines, measures are taken to minimize fuel consumption and harmful emissions. The emissions of diesel soot and NOx are reduced in the engine aftertreatment system (EAS) by respectively a diesel particulate filter and SCR catalyst. The diesel particulate filter collects soot while NOx typically reacts on the SCR (Selective Catalytic Reduction) catalyst with ammonia (formed out of injected urea) into harmless products also known as the deNOx process.

A soot filter becomes loaded with soot after a certain time of engine running and needs to be cleaned through active regeneration. During an active regeneration, extra hydrocarbons (HC) are injected in the EAS, via in-cylinder dosing or an additional fuel injector on the EAS system. The fuel oxidizes over the DOC and exhaust gases are heated due to this exothermal reaction, leading to an increase in exhaust gas temperature downstream of the DOC. The increased temperature is at a level that soot can oxidize in the soot filter, such that it becomes clean afterwards. This type of regeneration is referred to as 'conventional' regeneration.

Besides soot, other pollution like sulfates or deposits formed during urea decomposition are removed from the EAS by this conventional regeneration process. These so called urea deposits are formed when exhaust gas temperatures are insufficiently high for a complete evaporation of the injected urea. During that process, urea follows an alternative reaction path with isocyanic acid (HNCO), a gaseous product formed during decomposition of urea, and produces a solid polymer. Low exhaust gas temperatures and high urea dosing rates increase the risk on deposit formation. This is especially the case for low or intermittent loads of the engine, wherein the exhaust gas temperatures are too low for complete evaporation and decomposition of the urea. Accumulation of urea deposits in the EAS can lead to a higher backpressure for the engine (leads to increase of brake specific fuel consumption (BSFC) of the engine, e.g. due to higher scavenging losses) and poor ammonia distribution in the SCR catalyst, leading to a lower deNOx performance. A degraded deNOx performance forces the engine to run with lower engine out NOx-emissions, which generally leads to a higher BSFC (NOx—BSFC trade-off).

Urea deposits can be decomposed at higher temperatures, depending on the composition of the deposits. As stated before, the deposits are removed during a conventional regeneration, however when the deposit accumulation is very severe, a 'recovery' regeneration (RR) is necessary and can be triggered and executed. This is an active regeneration process used to recover the deNOx performance of the SCR by removing urea deposits and excessive ammonia from the system. During a recovery regeneration, as well as during a conventional regeneration, the engine is forced to operate in regeneration mode, which has an increased temperature and sufficient airflow, which is required for proper and safe fuel (HC) conversion over the DOC during a regeneration. This regeneration mode of the engine increases the BSFC, in addition to the BSFC increase due to the extra fuel which is injected to elevate the exhaust temperature downstream DOC during a regeneration.

EP2853707 proposes to keep the temperature of a diesel particulate filter high to increase the time and frequency of continuous regeneration, thus decreasing the frequency of forced regeneration of the diesel particulate filter device.

SUMMARY

It is an aspect of the present invention to alleviate, at least partially, the problems discussed above by providing a cyclic thermal treatment step in an after treatment system of a diesel engine of a vehicle, arranged to carry out
 a long cyclic thermal treatment process (referred to as a conventional regeneration), at a first time interval, at a first exhaust gas temperature higher than the operational temperature in regeneration mode; combined with
 a plurality of thermal measures in a short cyclic thermal treatment process carried out at a calculated second time interval within the first time interval, carried out at a second exhaust gas temperature where urea deposits in the aftertreatment system can be thermally decomposed; wherein the second elevated exhaust gas temperature is lower than the first temperature.

By the plurality of thermal measures, in practice ranging e.g. from 10-30 minutes in a short cyclic thermal treatment process the deNox performance can be kept in an optimal working range without substantial degradation. This can save a total amount of fuel for specific user conditions and vehicle applications because in the short cyclic thermal treatment process, the engine can continue to run in a fuel efficient setting. Furthermore, the process, by its proactive timing, is able to substantially prevent performance degradation due to e.g. urea deposit formation, sulphur contamination, e.g. due to engine oil consumption or from (high sulphur) diesel fuel, DOC face plugging, e.g. due to high engine out soot emissions.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

Unless otherwise defined, all terms (including technical and scientific terms) used herein have the same meaning as commonly understood by one of ordinary skill in the art to which this invention belongs as read in the context of the description and drawings. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some instances, detailed descriptions of well-known devices and methods may be omitted so as not to obscure the description of the present systems and methods. The term "anchor" includes any and all combinations of one or more of the associated listed items. It will be further understood that the terms "comprises" and/or "comprising" specify the presence of stated features but do not preclude the presence or addition of one or more other features. All publications, patent applications, patents, and other references mentioned herein are incorporated by reference in their entirety. In case of conflict, the present specification, including definitions, will control.

Figure 1:
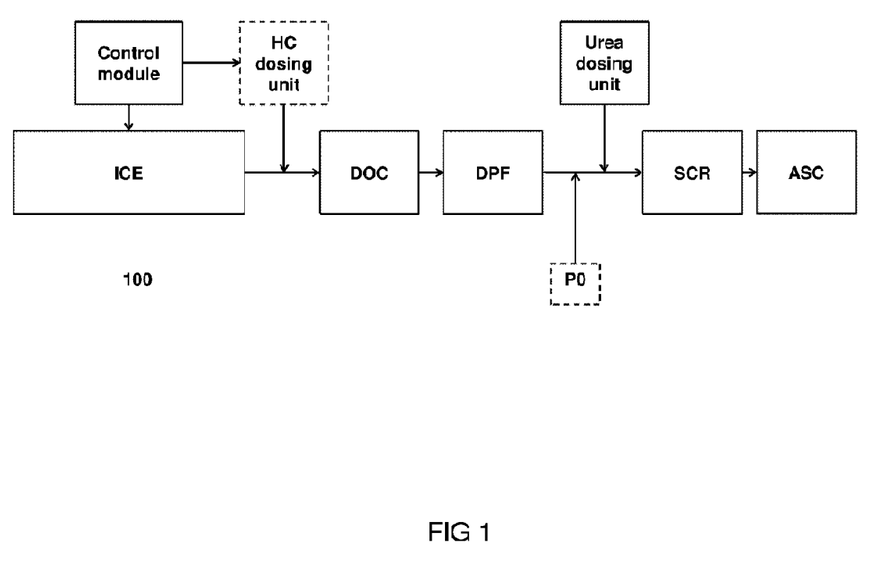
FIG. 1 shows a schematic representation of the system setup for performing the thermal treatment process.

A typical aftertreatment system may comprise of hydrocarbon (HC) dosing unit, Diesel Oxidation Catalyst (DOC), Diesel Particulate Filter (DPF), Urea dosing unit, Selective Catalytic Reduction catalyst (SCR), Ammonia Slip Catalyst (ASC) and Control Module (CM) placed downstream of the ICE (internal combustion engine) including a turbo compressor. This setup is conventional, in the sense that the system elements are known to the skilled person; in FIG. 1 given as a simplified schematic representation of a system setup 100. FIG. 1 further shows an important sensor parameter that can be sensed as a performance indicator, which is a pressure sensor P0 for measuring back pressure. However, P0 as indicated in the picture may not necessarily be at the indicated position but also other sensor positions in the system may be useful for measuring engine or aftertreatment performance. In addition, instead of a pressure sensor, other sensors may be used, for example flow sensors, chemical substance sensors, etc., that can indicate whether the aftertreatment system is affected by degradation. A typical, but not essential aspect of the aftertreatment system for this invention is a HC dosing unit, that may inject fuel in the exhaust. The fuel oxidizes over the DOC and leads to a temperature increase of the exhaust gas downstream the DOC due to the exothermal reaction. As an alternative, fuel can be injected via a late post injection system in the cylinder—injecting fuel in the exhaust without igniting it in the cylinder—or the ICE can operate with higher engine out exhaust gas temperatures.

Figure 2:
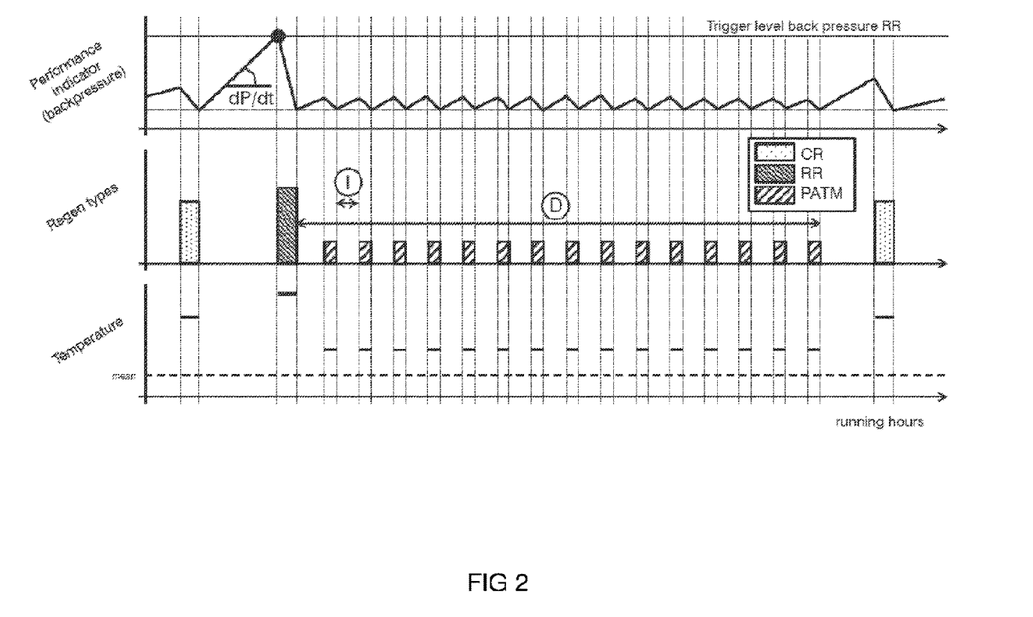
FIG. 2 shows a first example of the thermal treatment process.

In FIG. 2, a first example is provided of a short cyclic thermal treatment process which will also be indicated as PATM. In a typical situation, a recovery regeneration may be applied when the system performance is degraded to a specified trigger level. For example, an increase of backpressure may be detected by sensor P0 of FIG. 1, which can be an indication of severe deposit accumulation in the system. This deposit risk may be called for by a preset condition based on historical data, for example, when it is known from historical data, which backpressure belongs to a certain level of deposit accumulation. In the figure the performance indicator (P) signifies an increased backpressure level—meaning a decrease in performance—after a conventional regeneration (CR). A conventional regeneration is a regeneration that is carried out regardless, e.g. every 100 or 200 hours, to clean up the soot filter and to remove other unintended pollution from the engine aftertreatment system. The conventional regeneration is a long cyclic cleaning process with a first time interval, first exhaust gas temperature and has a specific duration. This conventional regeneration is performed in regeneration mode of the engine—elevated exhaust gas temperature upstream DOC with respect to standard operational temperatures in non-regeneration mode. An exemplary conventional regeneration temperature value may be an exhaust gas temperature downstream DOC higher than 450 degrees Celcius. The performance indicator may be measured by a time derivative dP/dt, but may also be measured by a trigger level (relative or absolute value). In the example, when a trigger level (backpressure) is reached, a recovery regeneration (RR) may be started. A recovery regeneration is a thermal treatment process, which is per se known to the skilled person, that may remove unintended pollution as accumulated deposits from the catalysts to recover deNOx performance. This is done by an increase in temperature applied to the aftertreatment system to a level where these deposits in the aftertreatment system are thermally decomposed, e.g. at temperatures higher than 450 degrees Celcius to a temperature as high as about 500-510 or even 550 degrees. It is a non-cyclic thermal treatment process which is triggered by a performance indicator (e.g. backpressure or deNOx performance). It is performed in engine regeneration mode and has a first exhaust gas temperature downstream DOC as the conventional regeneration and is applied for a specific duration. The recovery regeneration leads to an additional fuel penalty compared to a preferred situation of applying only conventional regenerations. A recovery regeneration may be used as trigger to start the Pro-Active Thermal Measure strategy, which is a short cyclic thermal treatment process at a second exhaust gas temperature downstream DOC higher than the operational temperature. A typical temperature may be around 350-450 degree Celsius or preferably 400-450 degrees Celcius, but are lower than the first temperatures of the conventional and recovery regenerations. A PATM typically takes 10-30 minutes of engine running time and may be able to keep the EAS clean from small accumulated deposits and unintended pollution, which affect the system performance (deNOx) of the EAS. This may result in overall fuel savings in certain vehicle applications, since the engine can continue to run in its normal, e.g. most fuel efficient setting. The PATM is applied with a specific second time interval (I) between two successive PATMs and may have a specific cyclic event duration (D). Both second interval (I) and cyclic event duration (D) can depend on one or more performance indicators. In FIG. 2, the increase of the backpressure over time (time derivative of performance indicator dP/dt) can be a measure for the degradation of the system performance, which is e.g. in this case the accumulation of deposits. A higher dP/dt at the trigger level for the recovery regeneration indicates a poorer system performance, e.g. faster accumulation of urea deposits. The selection of the interval and the cyclic event duration in the PATM strategy depends on dP/dt; the selection of an interval (I) and cyclic event duration (D) is driven by minimizing fuel consumption. Exemplary time intervals and cyclic event durations for the PATM may be respectively 8-20 hours and 100-140 hours when conventional regenerations take place every 150 hours where a single PATM event may be typically carried out for about 10-30 minutes, depending on achieving a time on temperature target.

The PATM is only applied when required, which means that more PATMs are required when the dP/dt is large—interval to reach trigger level is short—and less when dP/dt is small—interval to reach trigger level is long. The PATM strategy stops after a certain cyclic event duration since a conventional regeneration is always required, which is at a higher temperature downstream DOC than the PATM. The system is then cleaned by this conventional regeneration and therefore the PATM strategy can be stopped in advance of this regeneration to minimize fuel consumption. Note that a conventional regeneration has a higher cleaning ability than the PATM, however, at the cost of more fuel consumption. In addition, a recovery regeneration also has a higher cleaning ability, and for this reason it also resets the timer for engine running hours since last conventional regeneration, such that the long cyclic cleaning process restarts from the recovery regeneration.

Figure 3:
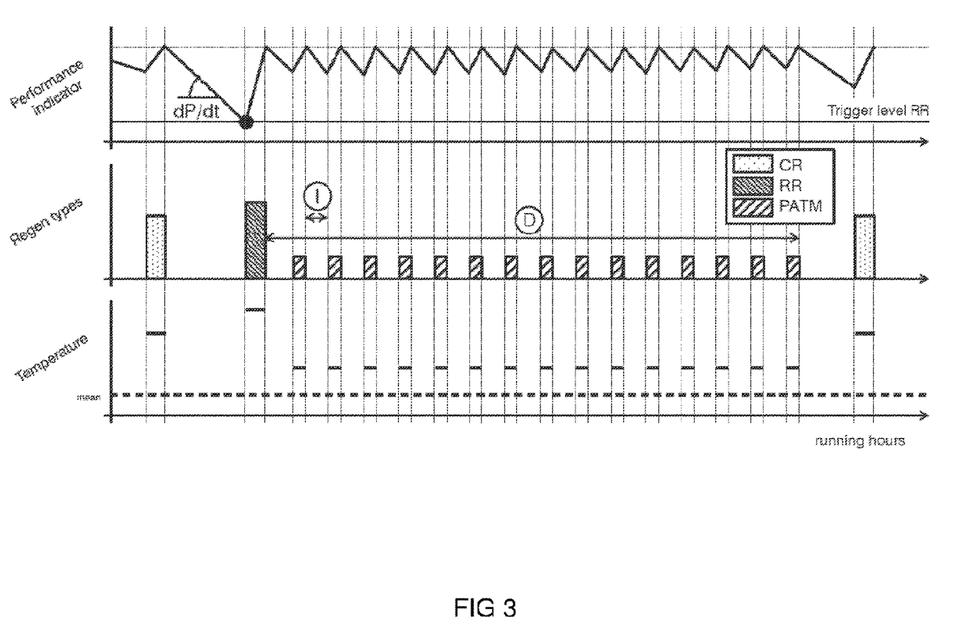
FIG. 3 shows a second example of the thermal treatment process.

FIG. 3 illustrates a similar graph as FIG. 2, however with another performance indicator chosen instead of a back pressure level. Here, depending on a trigger level, a recovery regeneration may be started. After the recovery regeneration, the PATM strategy is applied. The second time interval (I) and cyclic event duration (D) may be calculated as a function of the negative slope dP/dt of the performance indicator. A larger negative slope indicates a poorer system performance, and vice versa. Other performance indicators may be deNOx performance, emission concentrations, or fuel consumption.

Figure 4:
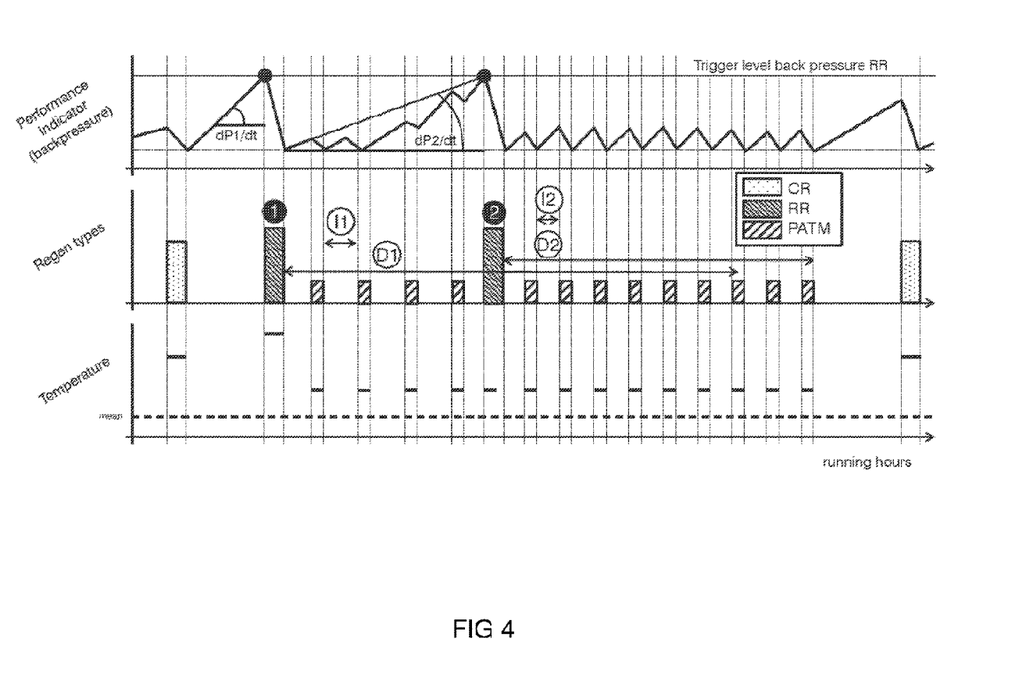
FIG. 4 shows a third example of the thermal treatment process.

FIG. 4 shows a variation on FIGS. 2 and 3, wherein the time interval and cyclic event duration of the short cyclic thermal treatment process are adjusted. That is, the second time interval of the short cyclic thermal treatment process may be varied in accordance with the derivatives of an performance indicator, in this case a trigger level of backpressure that is measured, which are dP1/dt and dP2/dt. The first thermal treatment process steps may start after the first recovery regeneration (RR1). The applied time interval (I1) of the first short cyclic thermal treatment process and cyclic event duration (D1) are selected based on a value of time derivative dP1/dt at a preset trigger level, which may be a time interval between the conventional regeneration and first recovery regeneration since the trigger level may be constant. When the applied short cyclic thermal treatment strategy is not able to maintain a good system performance, a second recovery regeneration (RR2) will be triggered due to increased backpressure, indicating a performance decrease. A newly applied time interval setting I2 and cyclic event duration D2 can be determined based on dP1/dt and a calculated dP2/dt, where e.g. a highest derivative may determine the interval and cyclic event duration of the second short cyclic thermal treatment strategy. Furthermore, a correction may be applied on the time interval settings and the cyclic event duration because of the need for a second recovery regeneration, which indicates that the first PATM strategy cannot keep a good system performance with the current time interval. For example, the first PATM strategy starts with RR1, which was triggered after 35 hrs. Based on dP1/dt, this time interval I1 is determined at e.g. 12 hours and the cyclic event duration at e.g. 120 hours. A second recovery regeneration is triggered after 50 hours w.r.t. to the first recovery regeneration which has reset the engine running hours for the long cyclic cleaning process. Since dP1/dt is smaller than dP2/dt, corresponding time interval and cyclic event duration are amended with a correction value, meaning that this interval becomes smaller, e.g. 11 hours, while the cyclic event duration is extended to 130 hrs. When dP2/dt is smaller than dP1/dt, e.g. when the interval between the first and the second recovery regeneration is 25 hrs, the time interval and cyclic event duration are both selected according to dP2/dt including a correction factor, leading to a smaller time interval of e.g. 10 hours and a cyclic event duration of e.g. 140 hours. The PATM strategy may be reset when a conventional regeneration takes place, i.e. after 150 hours in this example.

Applying of the PATM functionality as described for the examples in FIGS. 2, 3, and 4 leads to an enhanced system performance of the EAS regarding deNOx, which enables that the engine can run a fuel efficient setting. Recovery regenerations, which are very demanding for fuel consumption, may be prevented and the PATM strategy may lead to lower overall fuel consumption with respect to a situation where recovery regenerations are frequently applied, e.g. in low-load vehicle applications were exhaust gas temperatures are relatively low.

Figure 5:
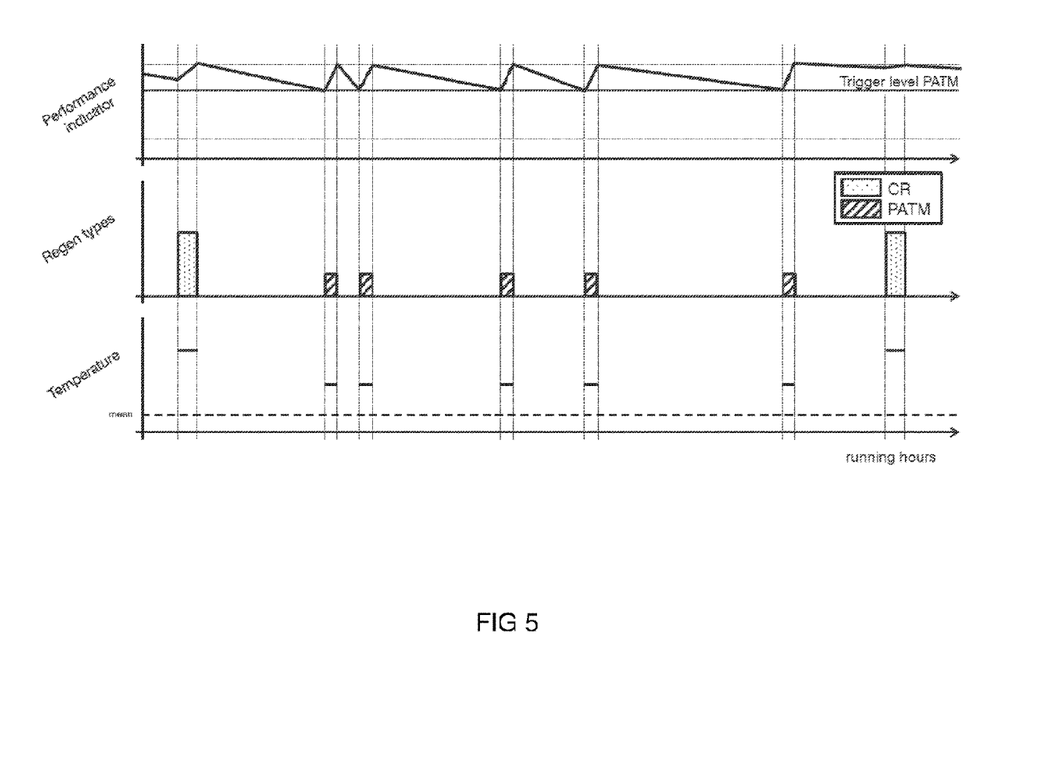
FIG. 5 shows a fourth example of the thermal treatment process.

FIG. 5 shows an example of an alternative PATM strategy, wherein based on a performance indicator signal, a PATM is carried out to remain a good EAS performance, which allows the engine to run in its most fuel efficient setting. The PATM is in this case independent of conventional and recovery regenerations, meaning that it can be applied when required according to the performance indicator. The performance indicator can be deNOx performance, but also a model-based or algorithm based parameter. A model may include a physical model which estimates e.g. deposit accumulation in the EAS or may be e.g. a statistic algorithm that takes into account the history of the operating conditions of the EAS, or may predict future performance degradations of the EAS. By using this alternative strategy, the PATM is only applied when it is needed, preserving the ideal operating conditions and minimizing fuel consumption.

Figure 6:
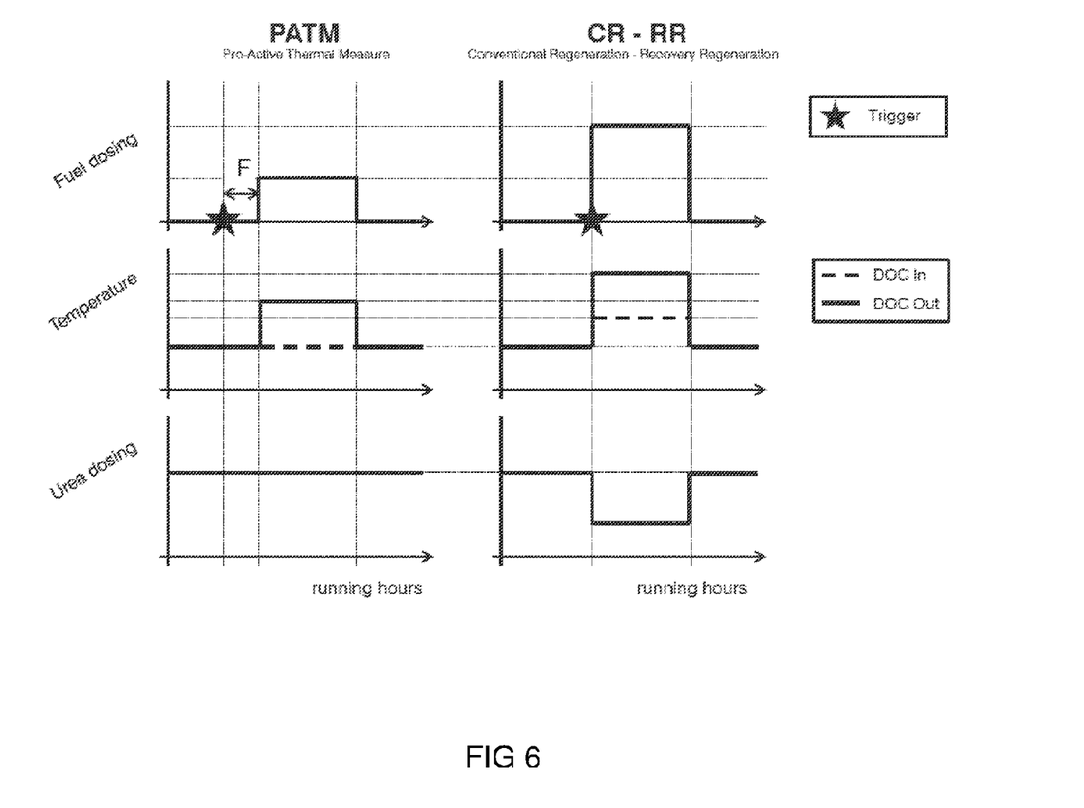
FIG. 6 shows fundamental parameters of a thermal treatment process and a conventional regeneration.

FIG. 6 shows further characteristics, that may be combined with the previous aspects of the PATM strategy. It shows that the PATM not necessarily needs to start at the trigger (e.g. after 12 hours according to the time interval) but starts e.g. when this can be done in a fuel efficient operating condition of the engine—for example when the temperature upstream DOC is at a certain value to reach proper and safe HC conversion on the DOC, e.g. at 250 degree Celsius. Thus, the time interval for carrying out the PATM may vary in accordance with an actual engine operating condition. This is further illustrated in FIG. 7. However, when a certain temperature level is not met with the actual efficient engine operation conditions within a further prescribed time interval, the thermal treatment step may be applied according to a preset maximum time interval value F. However, this means that the engine needs to go to regeneration mode to have sufficient temperature upstream DOC for proper HC conversion, which requires additional fuel for the engine. The regeneration mode used in conventional and recovery regenerations demands, in addition to extra fuel, to be injected to oxidize over the DOC, also extra fuel for engine operation. The figure shows that the amount of fuel dosed, which needs to oxidize over the DOC during a single PATM event, may be significantly lower than during a conventional regeneration and recovery regeneration, which consequently leads to a significantly lower exhaust gas temperature downstream DOC.

FIG. 6 further shows that the urea dosing can be kept at the same level during a PATM as in a normal operational mode, while it may be decreased during a conventional and recovery regeneration. Thus, the PATM strategy has less impact on deNOx performance than conventional and recovery regenerations, since urea dosing is not decreased during the short cyclic thermal treatment process.

Figure 7:
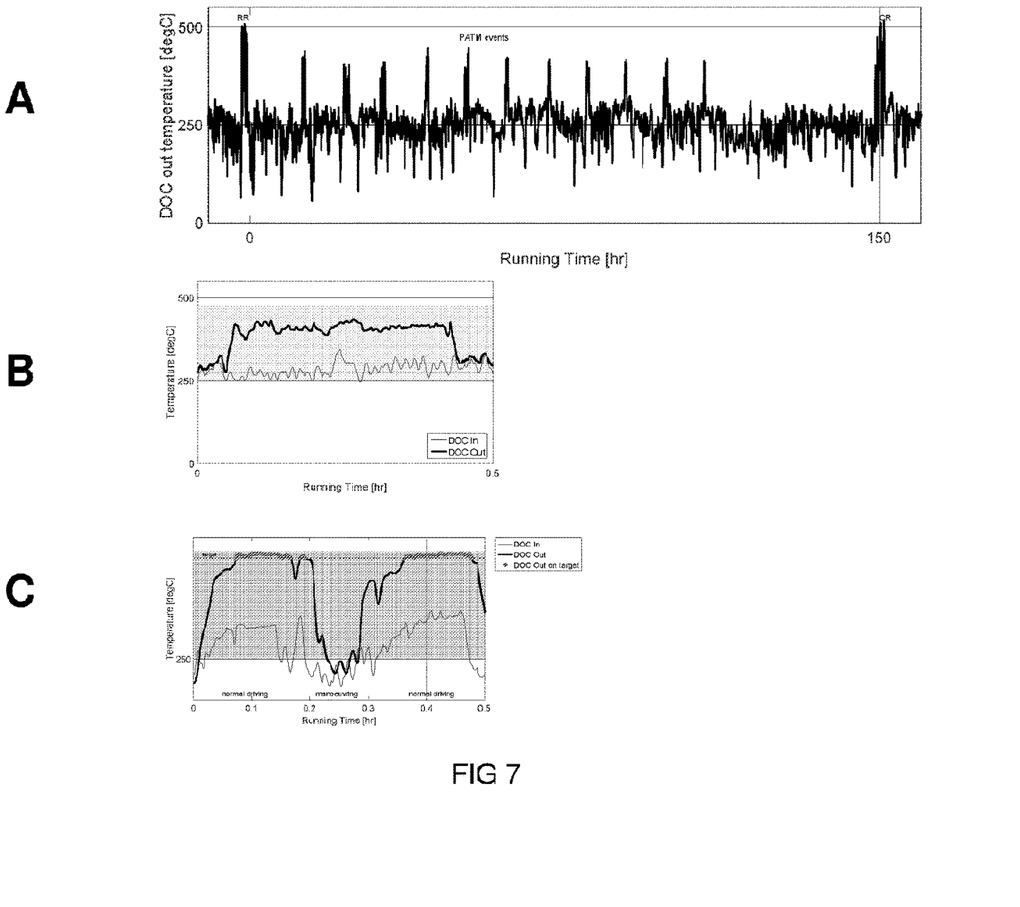
FIG. 7 (A-C) shows a PATM strategy executed in a practical example.

FIG. 7 shows a PATM strategy executed in a practical example. Thermal measures at elevated temperatures of about 400-450° C. are generated in a time span of about 150 hours after an initial Recovery Regeneration executed at time 0 that is executed at a high temperatures >450° C. The thermal measures (PATM events) executed thereafter are carried out at predefined calculated time intervals within the time span. The thermal measures can be stopped prior to the end of the time span, in expectation of the Conventional regeneration, that is carried out at a high temperature >450° C.

FIG. 7B shows a detailed 'PATM event' that is carried out at elevated temperature of about 400° C., compared to a normal operating temperature of about 250-300° C.

FIG. 7C shows that the PATM event is interrupted or delayed, in case a normal engine operating temperature falls below a threshold value, of about 250° C., e.g. due to low demand driving such as idling, maneuvering and low load driving. This threshold is a minimum value that enables efficient and safe oxidization of injected hydrocarbons over the DOC. After the temperature threshold is resumed, the PATM event can be (re)started, by restarting the hydrocarbon dosing process.

For example, as shown in the hypothetical example:

0-0.2 hrs: Normal driving behaviour of the truck where the DOC temperature is above 250° C., which is a minimal temperature for fuel injection in the exhaust (by additional HC dosing or in-cylinder) to be able to utilize the DOC 0.2-0.3 hrs: the truck is maneuvering, i.e. standstill and short driving action, so that the DOC temperature falls below 250° C. and additional fuel injection in the exhaust is stopped 0.3-0.5 hrs: regaining normal driving so that the DOC temperature rises above 250° C. and additional fuel can be injected.

The PATM event, as much as a conventional or recovery regeneration event is finished when a sufficient time on temperature target is reached, so that a duration of a PATM event can be dependent of a truck driving behaviour.

The invention claimed is:

1. A thermal treatment process in an after treatment system of a diesel engine of a vehicle said process comprising:
performing a long cyclic thermal treatment process of the after treatment system, performed with a first time interval with a duration longer than 100 hours, at a first exhaust gas temperature higher than an operational temperature of the diesel engine; and
performing a plurality of thermal measures carried out by fuel dosing in a short cyclic thermal treatment process carried out with calculated second time intervals during the first time interval, carried out at a second exhaust gas temperature where urea deposits in the after treatment system can be thermally decomposed;
wherein the second exhaust gas temperature is lower than the first temperature.

2. The thermal treatment process according to claim 1, wherein the short cyclic thermal treatment process is started after a non-cyclic recovery regeneration, that is initiated by a performance indicator level.

3. The thermal treatment process according to claim 1, wherein the short cyclic thermal treatment process ends prior to the first time interval with a pause duration larger than the second time interval.

4. The thermal treatment process according to claim 1, wherein the second time interval is less than 20 hours.

5. The thermal treatment process according to claim 1, wherein the first exhaust gas temperature is higher than 450 degrees celsius, and wherein the second exhaust gas temperature is lower than 450 degrees celsius.

6. The thermal treatment process according to claim 1, wherein the short cyclic thermal treatment process is carried out for event durations of 10-30 minutes.

7. The thermal treatment process according to claim 1, wherein the long cyclic thermal treatment process is carried out at a reduced urea dosing regime, and wherein the short cyclic thermal treatment process is carried out at a maintained urea dosing regime compared to non-regeneration mode.

8. The thermal treatment process according to claim 1, wherein any of the first and second time intervals are controlled by a sensor reading of reduced engine or after treatment performance.

9. The thermal treatment process according to claim 8, wherein the sensor reading concerns an increased NOx level or an increased backpressure in the after treatment system.

10. The thermal treatment process according to claim 1, wherein the second time interval is calculated as a function of the first time interval.

11. The thermal treatment process according to claim 1, wherein the second time interval is calculated as a function of an actual engine operating condition.

12. The thermal treatment process according to claim 1, wherein the second time interval is calculated as a function of a performance indicator.

13. The thermal treatment process according to claim 1, wherein the ending of the short cyclic thermal treatment process is calculated as a function of a performance indicator.

14. The thermal treatment process according to claim 1, wherein the elevated exhaust gas temperature is generated by oxidizing fuel on a diesel oxidation catalyst (DOC) device provided in an exhaust of the internal combustion engine.

15. The thermal treatment process according to claim 14, wherein the DOC device is fueled by a Hydrocarbon (HC) dosing device or via a late post-injection in the cylinder of the ICE.

16. A process controller comprising a non-transitory computer readable medium having a program of instructions embodied thereon for carrying out the thermal treatment process of claim 1.

* * * * *